US012812210B2

(12) United States Patent
Seol et al.

(10) Patent No.: US 12,812,210 B2
(45) Date of Patent: Nov. 24, 2026

(54) DISPLAY DEVICE AND OPERATION METHOD THEREOF

(71) Applicant: LG ELECTRONICS INC., Seoul (KR)

(72) Inventors: Seongwoon Seol, Seoul (KR); Obong An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/871,077

(22) PCT Filed: May 30, 2022

(86) PCT No.: PCT/KR2022/007676
§ 371 (c)(1),
(2) Date: Dec. 2, 2024

(87) PCT Pub. No.: WO2023/234431
PCT Pub. Date: Dec. 7, 2023

(65) Prior Publication Data
US 2025/0343971 A1 Nov. 6, 2025

(51) Int. Cl.
*H04N 21/458* (2011.01)
*H04N 21/431* (2011.01)
(Continued)

(52) U.S. Cl.
CPC ....... *H04N 21/458* (2013.01); *H04N 21/4316* (2013.01); *H04N 21/44008* (2013.01); *H04N 21/812* (2013.01)

(58) Field of Classification Search
CPC ............. H04N 21/458; H04N 21/4316; H04N 21/44008; H04N 21/812; H04N 21/2187;
(Continued)

(56) References Cited

U.S. PATENT DOCUMENTS

2013/0014182 A1* 1/2013 Nussel ............ H04N 21/26241
725/60
2015/0326945 A1* 11/2015 Johnson .............. H04N 21/472
725/32
(Continued)

FOREIGN PATENT DOCUMENTS

KR 1020140130047 11/2014
KR 101519032 5/2015
(Continued)

OTHER PUBLICATIONS

PCT International Application No. PCT/KR2022/007676, International Search Report dated Feb. 24, 2023, 3 pages.

*Primary Examiner* — Cynthia M Fogg
(74) *Attorney, Agent, or Firm* — LEE, HONG, DEGERMAN, KANG & WAIMEY

(57) ABSTRACT

Disclosed are a display device and an operation method thereof. The display device according to an embodiment disclosed herein may comprise: a memory; a control unit that generates an image file in a first format for a screen of content being played back in response to a content playback command, and controls a first service on the basis of the first format image file to output first nudge service data when the type of the content being played back is first content; and a display that outputs the first nudge service data on one area of the screen of content

13 Claims, 12 Drawing Sheets

(51) Int. Cl.
*H04N 21/44* (2011.01)
*H04N 21/81* (2011.01)

(58) Field of Classification Search
CPC .... H04N 21/431; H04N 21/44; H04N 21/443; H04N 21/472
USPC .............................................................. 725/32
See application file for complete search history.

(56) References Cited

U.S. PATENT DOCUMENTS

2015/0365244 A1* 12/2015 Schmitz ................ G06F 3/0484
715/753
2017/0094133 A1* 3/2017 Hamsici ................ G06F 1/1632
2018/0262809 A1* 9/2018 Li ......................... H04N 21/437
2022/0053242 A1* 2/2022 Lee .................. H04N 21/44008
2023/0262286 A1* 8/2023 Li ...................... H04N 21/4852

FOREIGN PATENT DOCUMENTS

KR 1020200036092 4/2020
KR 102232152 3/2021
KR 102244941 4/2021

* cited by examiner

DISPLAY DEVICE AND OPERATION METHOD THEREOF

CROSS-REFERENCE TO RELATED APPLICATION(S)

This application is the National Stage filing under 35 U.S.C. 371 of International Application No. PCT/KR2022/007676, filed on May 30, 2022, the contents of which are all incorporated by reference herein in its entirety.

TECHNICAL FIELD

The present disclosure relates to a display device, and more specifically, to a method and device for determining the type of content being played and providing nudge service data according to the determined type of content.

BACKGROUND ART

A display device is a device equipped with the function of receiving, processing, and displaying an image that a user can view. For example, the display device receives a broadcast signal selected by a user among broadcast signals transmitted from a broadcasting station, separates an image signal from the received signal, and displays the separated image signal on a display.

Meanwhile, recently, users' interest in various items exposed to images provided through a display device is increasing, and many purchases are being made for them. However, if information about an item exposed to a display device must be accessed and purchased through a separate medium or process such as the Internet, it may cause inconvenience to viewers.

For this reason, display devices are planning an advertisement nudge service for the content being played. However, there is a problem in providing appropriate advertisement nudges at the appropriate timing for the content being played on the display device.

DETAILED DESCRIPTION OF THE INVENTION

Technical Problem

The present disclosure provides a display device that determines the characteristics of content and provides suitable nudge service data in a timely manner according to the determined characteristics of the content.

The present disclosure provides another task of providing a display device that outputs nudge service data suitable for the characteristics of the corresponding content regardless of the availability of capture resources.

Technical Solution

A display device according to an embodiment of the present disclosure may include a memory; a controller configured to control a first service to generate an image file of a first format for a screen of content being played according to a content playback command, and output first nudge service data when the type of content being played is the first content based on the image file of the first format; and a display configured to output the first nudge service data on a portion of the screen of the content.

A method for providing a nudge service in a display device according to an embodiment of the present disclosure may include receiving a content playback command; generating an image file of a specific format for a screen of the content being played; generating specific nudge service data according to the type of the content being played based on the generated image file of the specific format; and outputting the specific nudge service data on an area of a screen of the content.

Effect of the Invention

According to at least one of the various embodiments of the present disclosure, there is an effect of being able to provide nudge service data suitable for the characteristics of the content.

According to at least one of the various embodiments of the present disclosure, nudge service data suitable for the characteristics of the content can be provided regardless of the capture resource, so that there is an effect of being able to efficiently use system resources and improve performance.

According to at least one of the various embodiments of the present disclosure, a nudge service suitable for the characteristics of the content can be exposed to the user, thereby meeting the expectations of the advertiser, and the user can conveniently access various advertisements while watching the content, thereby improving the convenience of use.

BEST MODE

Hereinafter, embodiments related to the present invention will be described in more detail with reference to the drawings. The suffixes "module" and "part" for components used in the following description are given or used interchangeably only for the ease of preparing the specification, and do not have distinct meanings or roles in themselves.

Figure 1:
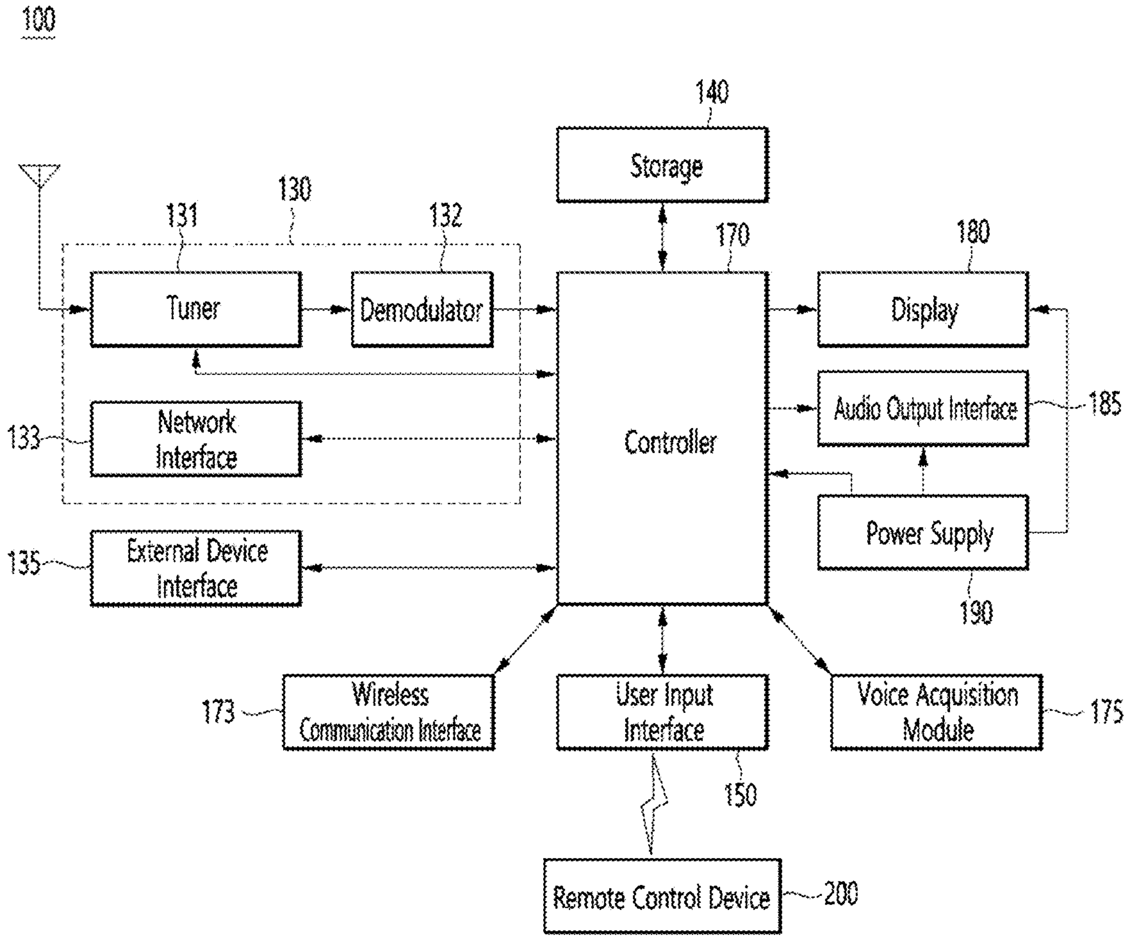
FIG. 1 is a block diagram illustrating the configuration of a display device according to one embodiment of the present disclosure.

FIG. 1 illustrates a block diagram of the configuration of a display device according to an embodiment of the present invention.

Referring to FIG. 1, the display device 100 includes a broadcast receiver 130, an external device interface 135, a memory 140, a user input interface 150, a controller 170, a wireless communication interface 173, and a display. It can include 180, a speaker 185, and a power supply circuit 190.

The broadcast receiver 130 can include a tuner 131, a demodulator 132, and a network interface 133.

The tuner 131 can select a specific broadcast channel according to a channel selection command. The tuner 131 can receive a broadcast signal for a specific selected broadcast channel.

The demodulator 132 can separate the received broadcast signal into a video signal, an audio signal, and a data signal related to the broadcast program, and can restore the separated video signal, audio signal, and data signal to a form that can be output.

The network interface 133 can provide an interface for connecting the display device 100 to a wired/wireless network including an Internet network. The network interface 133 can transmit or receive data with other users or other electronic devices through a connected network or another network linked to the connected network.

The network interface 133 can access a certain web page through a connected network or another network linked to the connected network. In other words, it can access a certain web page through a network and transmit or receive data with the corresponding server.

And the network interface 133 can receive content or data provided by a content provider or network operator. That is, the network interface 133 can receive content and information related thereto, such as movies, advertisements, games, VODs, and broadcast signals, provided from a content provider or network provider through a network.

Additionally, the network interface 133 can receive firmware update information and update files provided by a network operator, and can transmit data to the Internet, a content provider, or a network operator.

The network interface 133 can select and receive a desired application from among applications open to the public through a network.

The external device interface 135 can receive an application or application list within an adjacent external device and transfer it to the controller 170 or memory 140.

The external device interface 135 can provide a connection path between the display device 100 and an external device. The external device interface 135 can receive one or more of video and audio output from an external device connected wirelessly or wired to the display device 100 and transmit it to the controller 170. The external device interface 135 can include a plurality of external input terminals. The plurality of external input terminals can include an RGB terminal, one or more High-Definition Multimedia Interface (HDMI) terminals, and a component terminal.

An image signal from an external device input through the external device interface 135 can be output through the display 180. A voice signal from an external device input through the external device interface 135 can be output through the speaker 185.

An external device that can be connected to the external device interface 135 can be any one of a set-top box, Blu-ray player, DVD player, game console, sound bar, smartphone, PC, USB memory, or home theater, but this is only an example.

Additionally, some of the content data stored in the display device 100 can be transmitted to a selected user or selected electronic device among other users or other electronic devices pre-registered in the display device 100.

The memory 140 stores programs for processing and controlling each signal in the controller 170, and can store signal-processed video, voice, or data signals.

In addition, the memory 140 can perform a function for temporarily storing video, voice, or data signals input from the external device interface 135 or the network interface 133, and can provide information about a predetermined image through the channel memory function.

The memory 140 can store an application or application list input from the external device interface 135 or the network interface 133.

The display device 100 can play content files (video files, still image files, music files, document files, application files, etc.) stored in the memory 140 and provide them to the user.

The user input interface 150 can transmit a signal input by the user to the controller 170 or transmit a signal from the controller 170 to the user. For example, the user input interface 150 can be configured according to various communication methods such as Bluetooth™, Ultra Wideband (UWB), ZigBee, Radio Frequency (RF) communication, or Infrared (IR) communication. Control signals such as power on/off, channel selection, and screen settings can be received and processed from the remote control device 200, or control signals from the controller 170 can be processed to be transmitted to the remote control device 200.

Additionally, the user input interface 150 can transmit control signals input from local keys (not shown) such as power key, channel key, volume key, and setting value to the controller 170.

The video signal processed by the controller 170 can be input to the display 180 and displayed as an image corresponding to the video signal. Additionally, the image signal processed by the controller 170 can be input to an external output device through the external device interface 135.

The voice signal processed by the controller 170 can be output as audio to the speaker 185. Additionally, the voice signal processed by the controller 170 can be input to an external output device through the external device interface 135.

In addition, the controller 170 can control overall operations within the display device 100.

In addition, the controller 170 can control the display device 100 by a user command or internal program input through the user input interface 150, and connects to the network to download an application or application list desired by the user within the display device 100.

The controller 170 allows channel information selected by the user to be output through the display 180 or speaker 185 along with the processed video or audio signal.

In addition, the controller 170 controls video signals or video signals from an external device, for example, a camera or camcorder, input through the external device interface 135, according to an external device image playback command received through the user input interface 150. The audio signal can be output through the display 180 or speaker 185.

Meanwhile, the controller 170 can control the display 180 to display an image, for example, a broadcast image input through the tuner 131, an external input image input through the external device interface 135, Alternatively, an image input through the network interface unit or an image stored in the memory 140 can be controlled to be displayed on the display 180. In this case, the image displayed on the display 180 can be a still image or a moving image, and can be a 2D image or a 3D image.

Additionally, the controller 170 can control the playback of content stored in the display device 100, received broadcast content, or external input content, which can include broadcast video, external input video, audio files, it can be in various forms, such as still images, connected web screens, and document files.

The wireless communication interface 173 can communicate with external devices through wired or wireless communication. The wireless communication interface 173 can perform short range communication with an external device. For this purpose, the wireless communication interface 173 includes Bluetooth, Radio Frequency Identification (RFID), Infrared Data Association (IrDA), UWB, ZigBee, Near Field Communication (NFC), Wireless-Fidelity (Wi-Fi), and Wi-Fi.-Short-distance communication can be supported using at least one of Fi Direct and Wireless USB (Wireless Universal Serial Bus) technologies. This wireless communication interface 173 is between the display device 100 and a wireless communication system, between the display device 100 and another display device 100, or between the display device 100 and the display device 100 through wireless area networks. Wireless communication between networks where the display device 100 or an external server is located can be supported. Local area wireless networks can be wireless personal area networks.

Here, the other display device is a wearable device capable of exchanging data with (or interoperating with) the display device 100 according to the present invention (for example, a smartwatch, smart glass, HMD (head-mounted display), or a mobile terminal such as a smart phone). The wireless communication interface 173 can detect (or recognize) a wearable device capable of communication around the display device 100.

The voice acquisition unit 175 can acquire audio. The voice acquisition unit 175 can include at least one microphone (not shown) and can acquire audio around the display device 100 through the microphone (not shown).

The display 180 converts video signals, data signals, and on screen display (OSD) signals processed by the controller 170 or video signals and data signals received from the external device interface 135 into R, G, and B signals, respectively. A driving signal can be generated by conversion.

Meanwhile, the display device 100 shown in FIG. 1 is only one embodiment of the present invention. Some of the illustrated components can be integrated, added, or omitted depending on the specifications of the display device 100 that is actually implemented.

That is, as needed, two or more components can be combined into one component, or one component can be subdivided into two or more components. In addition, the functions performed by each block are for explaining embodiments of the present invention, and the specific operations or devices do not limit the scope of the present invention.

According to another embodiment of the present invention, unlike shown in FIG. 1, the display device 100 does not have a tuner 131 and a demodulator 132 but has a network interface 133 or an external device interface 135 to also receive and play video through them.

For example, the display device 100 includes an image processing device such as a set-top box (STB) for receiving broadcast signals or contents according to various network services, and content input from the image processing device. It can be implemented separately as a content playback device that plays.

In this case, the method of operating a display device according to an embodiment of the present invention to be described below includes not only the display device 100 as described with reference to FIG. 1, but also an image processing device such as the separate set-top box or a display 180 and a content playback device having an audio output unit (speaker) 185.

The audio output unit 185 receives a signal processed by the controller 170 and outputs it as voice.

The power supply unit 190 supplies the corresponding power to the entire display device 100. In particular, it can supply power to the controller 170 that can be implemented in the form of a system on chip (SOC), the display unit 180 for displaying images, and the audio output unit 185 for audio output.

Specifically, the power supply unit 190 can be equipped with a converter that converts AC power into DC power and a dc/dc converter that converts the level of the DC power.

Next, with reference to FIGS. 2 and 3, a remote control device according to an embodiment of the present disclosure will be described.

Figure 2:
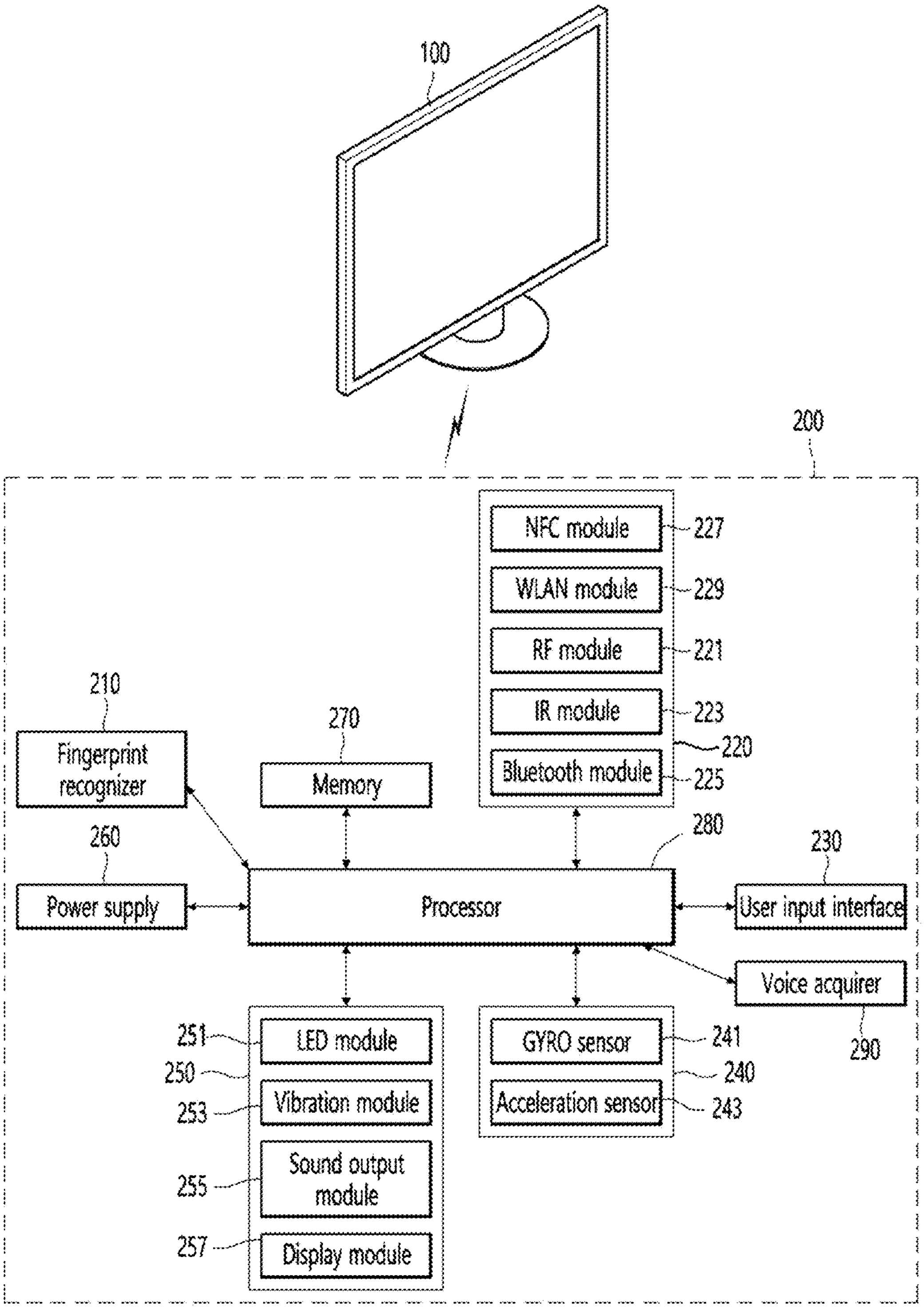
FIG. 2 is a block diagram of a remote control device according to an embodiment of the present disclosure.
Figure 3:
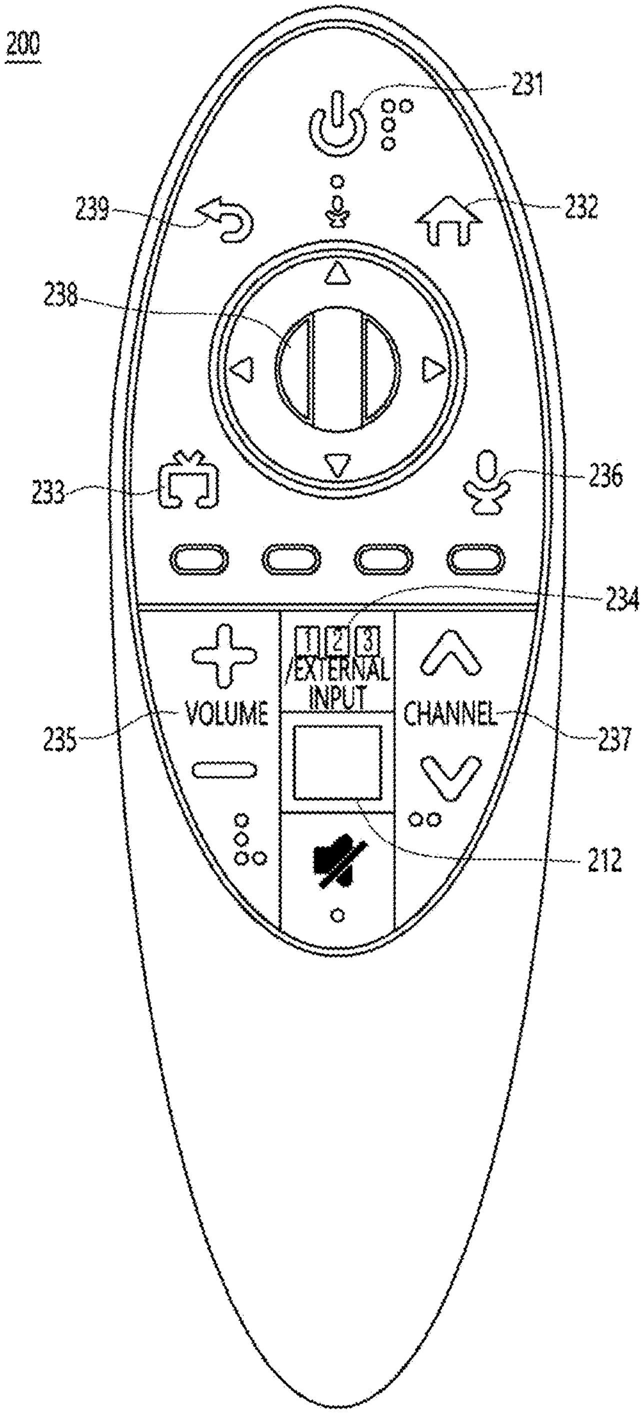
FIG. 3 illustrates an example of an actual configuration of a remote control device according to an embodiment of the present disclosure.

FIG. 2 is a block diagram of a remote control device according to an embodiment of the present disclosure, and FIG. 3 shows an example of an actual configuration of a remote control device according to an embodiment of the present disclosure.

First, referring to FIG. 2, the remote control device 200 may include a fingerprint recognition unit 210, a wireless communication unit 220, a user input unit 230, a sensor unit 240, an output unit 250, a power supply unit 260, a storage unit 270, a controller 280, and a voice acquisition unit 290.

Referring to FIG. 2, the wireless communication unit 220 transmits and receives signals with any one of the display devices according to the embodiments of the present disclosure described above.

The remote control device 200 may be equipped with an RF module 221 capable of transmitting and receiving signals with the display device 100 according to RF communication standards, and an IR module 223 capable of transmitting and receiving signals with the display device 100 according to IR communication standards. In addition, the remote control device 200 may be equipped with a Bluetooth module 225 capable of transmitting and receiving signals with the display device 100 according to Bluetooth communication standards. In addition, the remote control device 200 may be equipped with an NFC (Near Field Communication) module 227 capable of transmitting and receiving signals with the display device 100 according to NFC communication standards, and a WLAN (Wireless LAN) module 229 capable of transmitting and receiving signals with the display device 100 according to WLAN communication standards.

In addition, the remote control device 200 transmits a signal containing information about the movement of the remote control device 200 to the display device 100 through the wireless communication unit 220.

Meanwhile, the remote control device 200 can receive a signal transmitted by the display device 100 through the RF module 221, and, if necessary, can transmit commands for power on/off, channel change, volume change, etc. to the display device 100 through the IR module 223.

The user input unit 230 can be composed of a keypad, a button, a touch pad, or a touch screen. The user can input a command related to the display device 100 to the remote control device 200 by operating the user input unit 230. If the user input unit 230 is equipped with a hard key button, the user can input a command related to the display device 100 to the remote control device 200 through a push operation of the hard key button. This is explained with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, a confirmation button 238, and a back button 239.

The fingerprint recognition button 212 may be a button for recognizing a user's fingerprint. In one embodiment, the fingerprint recognition button 212 may be capable of a push operation, and may receive a push operation and a fingerprint recognition operation. The power button 231 may be a button for turning the power of the display device 100 on/off. The home button 232 may be a button for moving to the home screen of the display device 100. The live button 233 may be a button for displaying a real-time broadcast program. The external input button 234 may be a button for receiving an external input connected to the display device 100. The volume control button 235 may be a button for adjusting the volume output by the display device 100. The voice recognition button 236 may be a button for receiving a user's voice and recognizing the received voice. The channel change button 237 may be a button for receiving a broadcast signal of a specific broadcast channel. The confirmation button 238 may be a button for selecting a specific function, and the back button 239 may be a button for returning to the previous screen.

Referring again to FIG. 2.

If the user input unit 230 has a touch screen, the user may input a command related to the display device 100 using the remote control device 200 by touching a soft key of the touch screen. In addition, the user input unit 230 may be equipped with various types of input means that can be operated by the user, such as a scroll key or a jog key, and this embodiment does not limit the scope of the rights of the present disclosure.

The sensor unit 240 may be equipped with a gyro sensor 241 or an acceleration sensor 243, and the gyro sensor 241 may sense information about the movement of the remote control device 200.

For example, the gyro sensor 241 may sense information about the operation of the remote control device 200 based on the x, y, and z axes, and the acceleration sensor 243 may sense information about the movement speed of the remote control device 200. Meanwhile, the remote control device 200 may further be equipped with a distance measuring sensor, and may sense the distance to the display unit 180 of the display device 100.

The output unit 250 can output a video or audio signal corresponding to the operation of the user input unit 230 or the signal transmitted from the display device 100. Through the output unit 250, the user can recognize whether the user input unit 230 is being operated or whether the display device 100 is being controlled.

For example, the output unit 250 can be equipped with an LED module 251 that lights up when the user input unit 230 is operated or a signal is transmitted and received with the display device 100 through the wireless communication unit 220, a vibration module 253 that generates vibration, an audio output module 255 that outputs sound, or a display module 257 that outputs an image.

In addition, the power supply unit 260 supplies power to the remote control device 200, and can reduce power waste by stopping the power supply when the remote control device 200 does not move for a predetermined period of time. The power supply unit 260 can resume the power supply when a predetermined key provided in the remote control device 200 is operated.

The storage unit 270 can store various types of programs, application data, etc. required for the control or operation of the remote control device 200. If the remote control device 200 wirelessly transmits and receives signals through the display device 100 and the RF module 221, the remote control device 200 and the display device 100 transmit and receive signals through a predetermined frequency band.

The controller 280 of the remote control device 200 can store and refer to information about the frequency band, etc., that can wirelessly transmit and receive signals with the display device 100 paired with the remote control device 200, in the storage unit 270.

The controller 280 controls all matters related to the control of the remote control device 200. The controller 280 can transmit a signal corresponding to a predetermined key operation of the user input unit 230 or a signal corresponding to the movement of the remote control device 200 sensed by the sensor unit 240 to the display device 100 through the wireless communication unit 220.

In addition, the voice acquisition unit 290 of the remote control device 200 can acquire voice.

The voice acquisition unit 290 may include at least one microphone, and may acquire voice through the microphone.

Next, FIG. 4 will be described.

Figure 4:
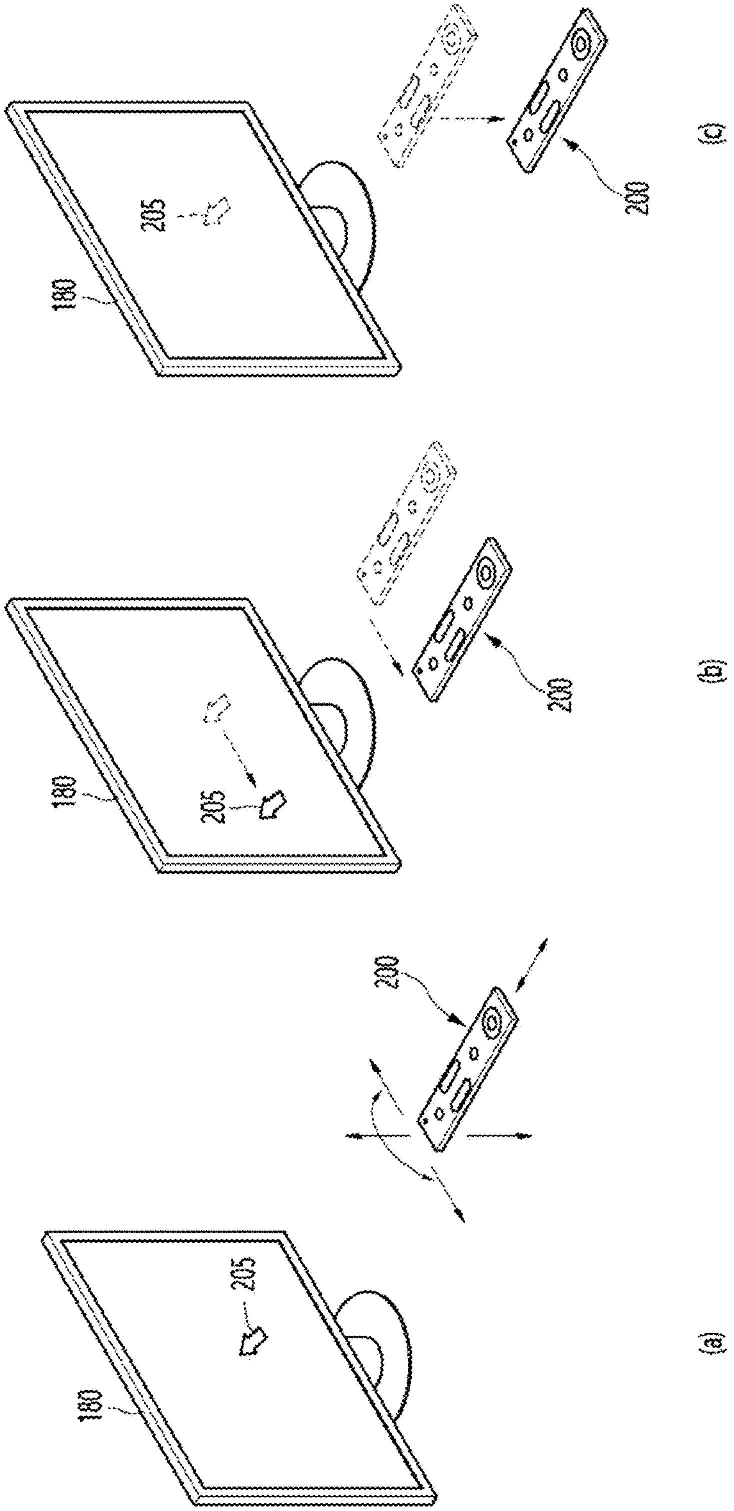
FIG. 4 illustrates an example of utilizing a remote control device according to an embodiment of the present disclosure.

FIG. 4 illustrates an example of utilizing a remote control device according to an embodiment of the present disclosure.

FIG. 4(*a*) illustrates that a pointer 205 corresponding to a remote control device 200 is displayed on a display unit 180.

A user may move or rotate the remote control device 200 up and down, left and right. The pointer 205 displayed on the display unit 180 of the display device 100 corresponds to the movement of the remote control device 200. This remote control device 200 may be named a space remote control because, as shown in the drawing, the pointer 205 moves and is displayed according to the movement in 3D space.

FIG. 4(*b*) exemplifies that when a user moves the remote control device 200 to the left, the pointer 205 displayed on the display unit 180 of the display device 100 also moves to the left in response.

Information about the movement of the remote control device 200 detected through the sensor of the remote control device 200 is transmitted to the display device 100. The display device 100 can calculate the coordinates of the pointer 205 from the information about the movement of the remote control device 200. The display device 100 can display the pointer 205 to correspond to the calculated coordinates.

FIG. 4(*c*) exemplifies a case where a user moves the remote control device 200 away from the display unit 180 while pressing a specific button within the remote control device 200. As a result, a selection area within the display unit 180 corresponding to the pointer 205 may be zoomed in and displayed in an enlarged manner.

Conversely, when the user moves the remote control device 200 closer to the display unit 180, a selection area within the display unit 180 corresponding to the pointer 205 may be zoomed out and displayed in a reduced manner.

Meanwhile, when the remote control device 200 moves away from the display unit 180, the selection area may be zoomed out, and when the remote control device 200 moves closer to the display unit 180, the selection area may be zoomed in.

In addition, when a specific button in the remote control device 200 is pressed, recognition of up, down, left, and right movements can be excluded. That is, when the remote control device 200 moves away from or toward the display unit 180, up, down, left, and right movements are not recognized, and only forward and backward movements can be recognized. When a specific button in the remote control device 200 is not pressed, only the pointer 205 moves according to the up, down, left, and right movements of the remote control device 200.

Meanwhile, the moving speed or moving direction of the pointer 205 can correspond to the moving speed or moving direction of the remote control device 200.

Meanwhile, the pointer in this specification means an object displayed on the display unit 180 in response to the operation of the remote control device 200. Therefore, objects of various shapes other than the arrow shape illustrated in the drawing are possible as the pointer 205. For example, it may be a concept including a point, a cursor, a prompt, a thick outline, etc. In addition, the pointer 205 may be displayed corresponding to one point of the horizontal and vertical axes on the display unit 180, and may also be displayed corresponding to multiple points such as lines and surfaces.

Hereinafter, various embodiments related to providing nudge service data suitable for content being played on a display device 100 are described.

The nudge service data described in the present disclosure may include, for example, general nudge service data and sponsor nudge service data. In this case, the general nudge service data may represent nudge service data that does not expose, for example, a brand name for advertising. According to an embodiment, the general nudge service data may be nudge service data that has little relevance to the content of the content being played. The sponsor nudge service data may represent nudge service data that exposes, for example, a brand name, and is configured to increase the advertising effect. According to an embodiment, the sponsor nudge service data may be nudge service data related to the content of the content being played or a specific scene or specific item within the content. However, the nudge service data according to the present disclosure may not be limited to the above definition.

Meanwhile, the nudge service data may have a specific output time within the content depending on a request or setting. However, depending on the embodiment, the time may be arbitrarily determined at any time while the corresponding content is being played, or may not be specific.

Figure 11:
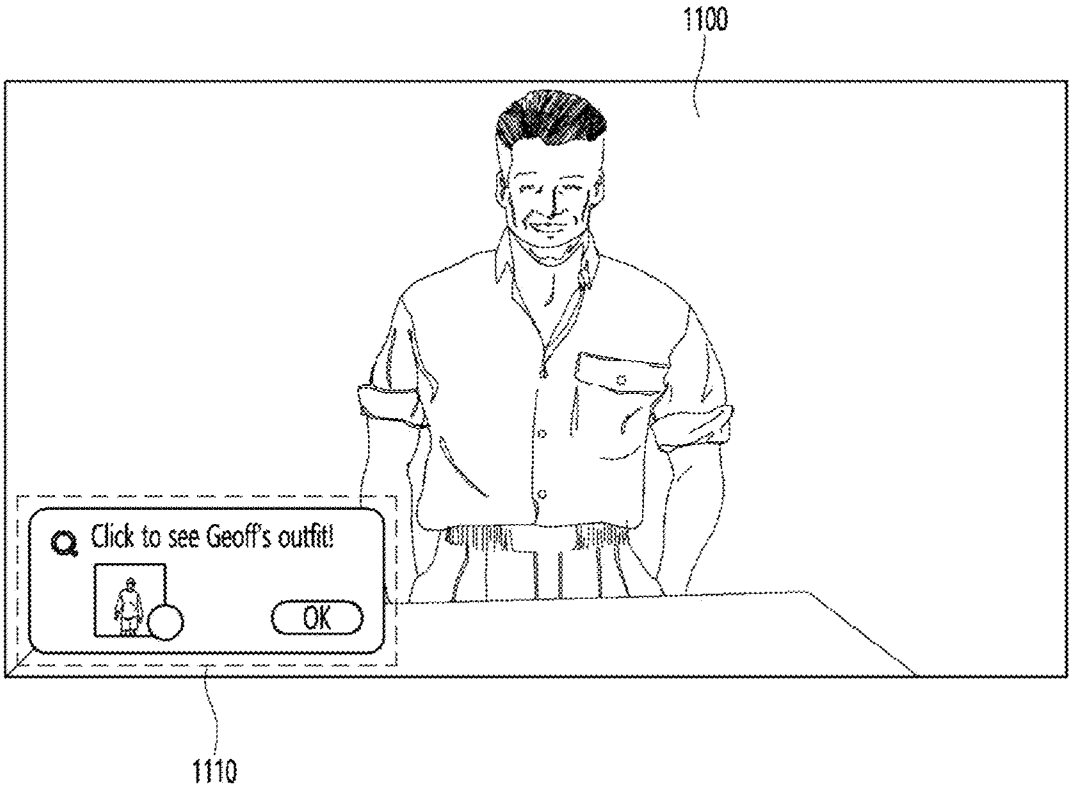
FIG. 11 is a diagram illustrating a screen during which a nudge service is provided according to an embodiment of the present disclosure.
Figure 12:
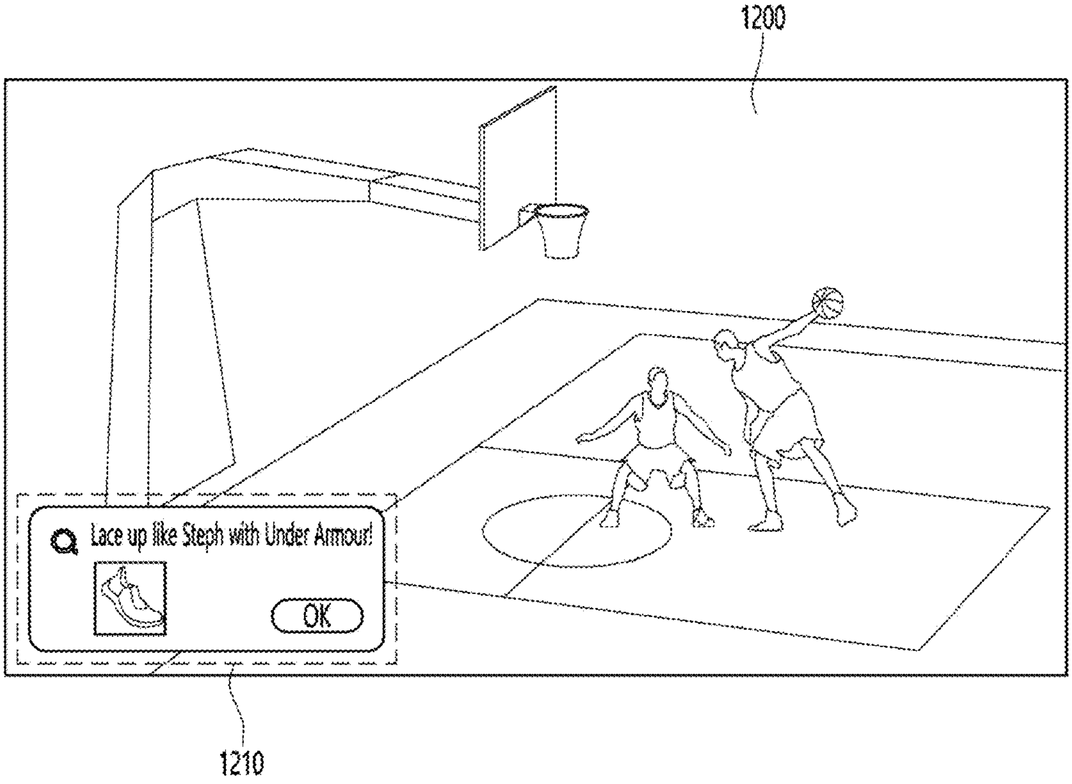
FIG. 12 is a drawing illustrating a screen provided by a nudge service according to another embodiment of the present disclosure.

Depending on the embodiment, the display device 100 may expose (i.e., output) general nudge service data (as shown in FIG. 11) or sponsor nudge service data (as shown in FIG. 12) for one content on one area of the content screen being played. The exposure location of the nudge service data may be different from that shown in FIG. 11 or 12, and the location with the highest advertising effect may be arbitrarily determined.

According to another embodiment, the display device 100 may output both general nudge service data and sponsor nudge service data for one content on one area of the content screen being played. At this time, the general nudge service data and the sponsor nudge service data may be provided at the same time, or they may be provided at different playback times with a time difference. According to an embodiment, in the case where the general and sponsor nudge service data are output at the same time, the output area may be different so that each nudge service data is distinguished from each other, or in particular, the sponsor nudge service data may be provided differentiated from the general nudge service data. In addition, the general nudge service data and/or the sponsor nudge service data for one content need not necessarily be 1, and may be plural.

In this disclosure, for convenience of explanation, it is disclosed as an embodiment that the general or sponsor nudge service is provided by distinguishing it according to the characteristics (e.g., type, property, etc.) of the content being played.

According to one embodiment, the display device 100 may output sponsor nudge service data when the type of content being played is a VOD video, and may output general nudge service data when the type is live TV. However, the present disclosure is not limited thereto.

Figure 5:
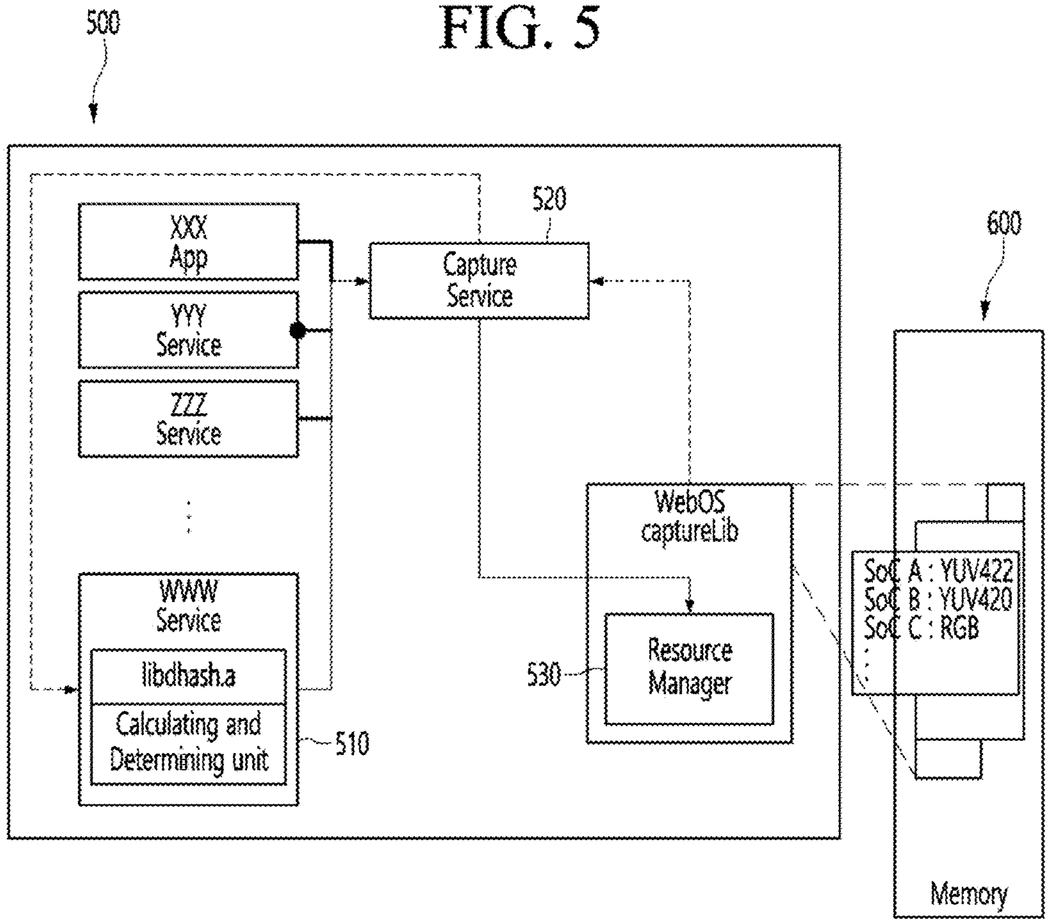
FIG. 5 is a diagram illustrating a display device providing a nudge service according to an embodiment of the present disclosure.
Figure 8:
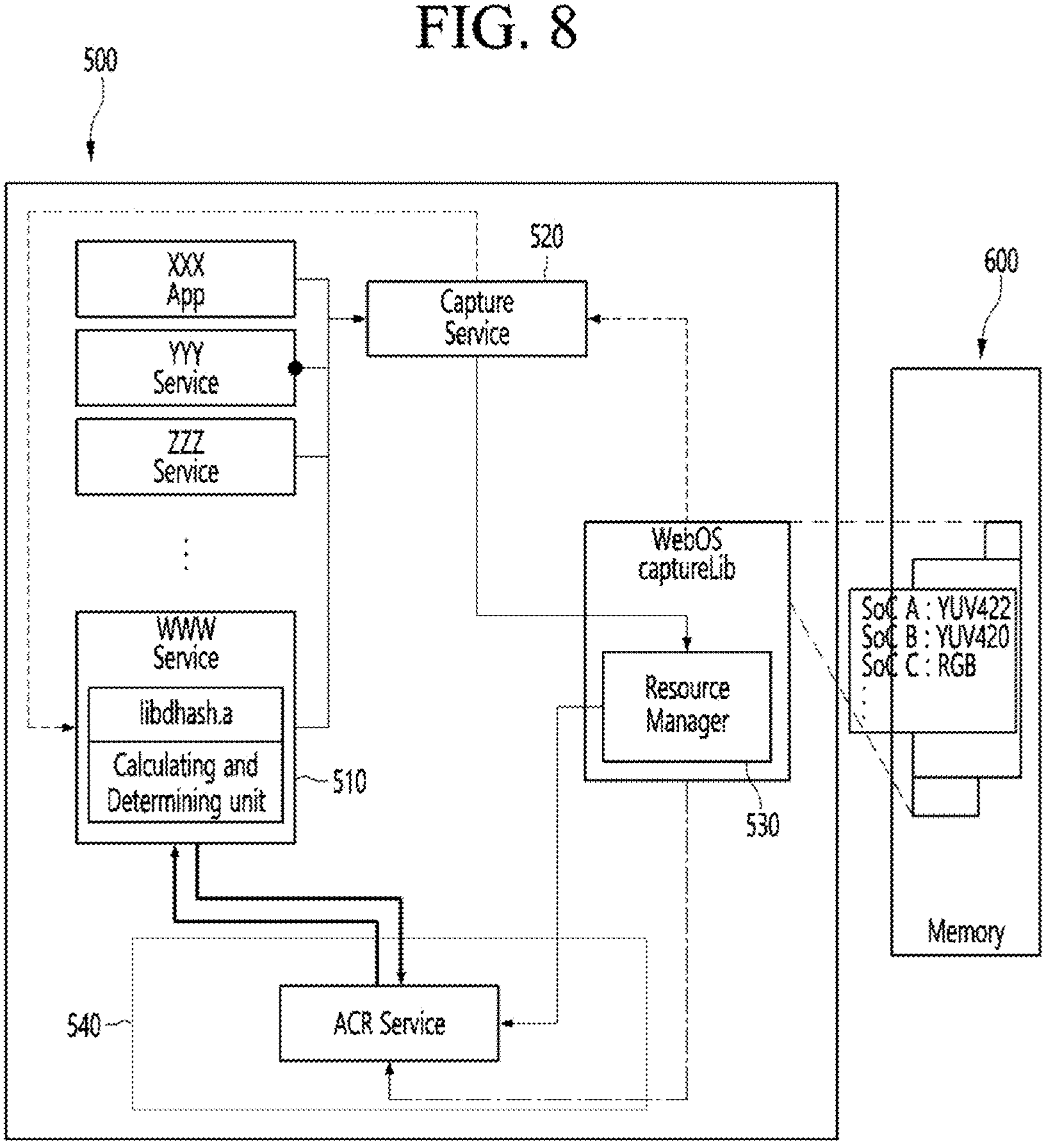
FIG. 8 is a diagram illustrating a display device providing a nudge service according to another embodiment of the present disclosure.

Referring to FIGS. 5 and 8 described below, the display device 100 according to one embodiment of the present disclosure may include a processor 500 and a memory 600 to provide a nudge service.

At this time, the processor 500 may correspond to the controller 170 or the main board illustrated in FIG. 1 or may be a component thereof. However, the present disclosure is not limited thereto. Meanwhile, the memory 600 may be the memory 140 illustrated in FIG. 1 or a separate memory or a storage device located remotely.

Meanwhile, even if it is described as simply a service or library in the following specification, it can be performed by a hardware configuration that is in charge of or manages the service or library.

Figure 6:
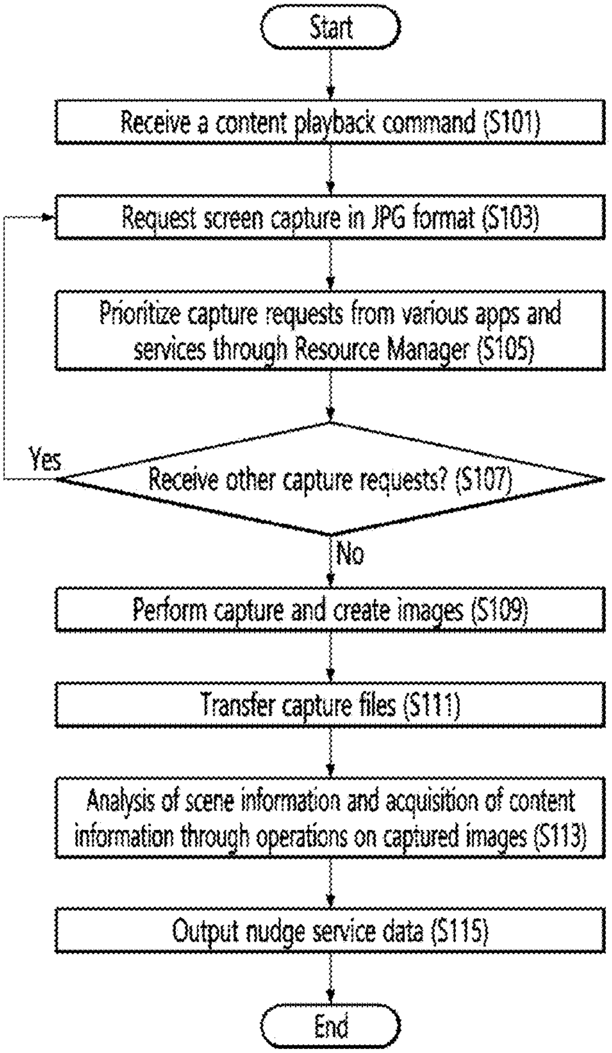
FIGS. 6 and 7 are flowcharts illustrating a process of processing a nudge service in the display device of FIG. 5.
Figure 7:
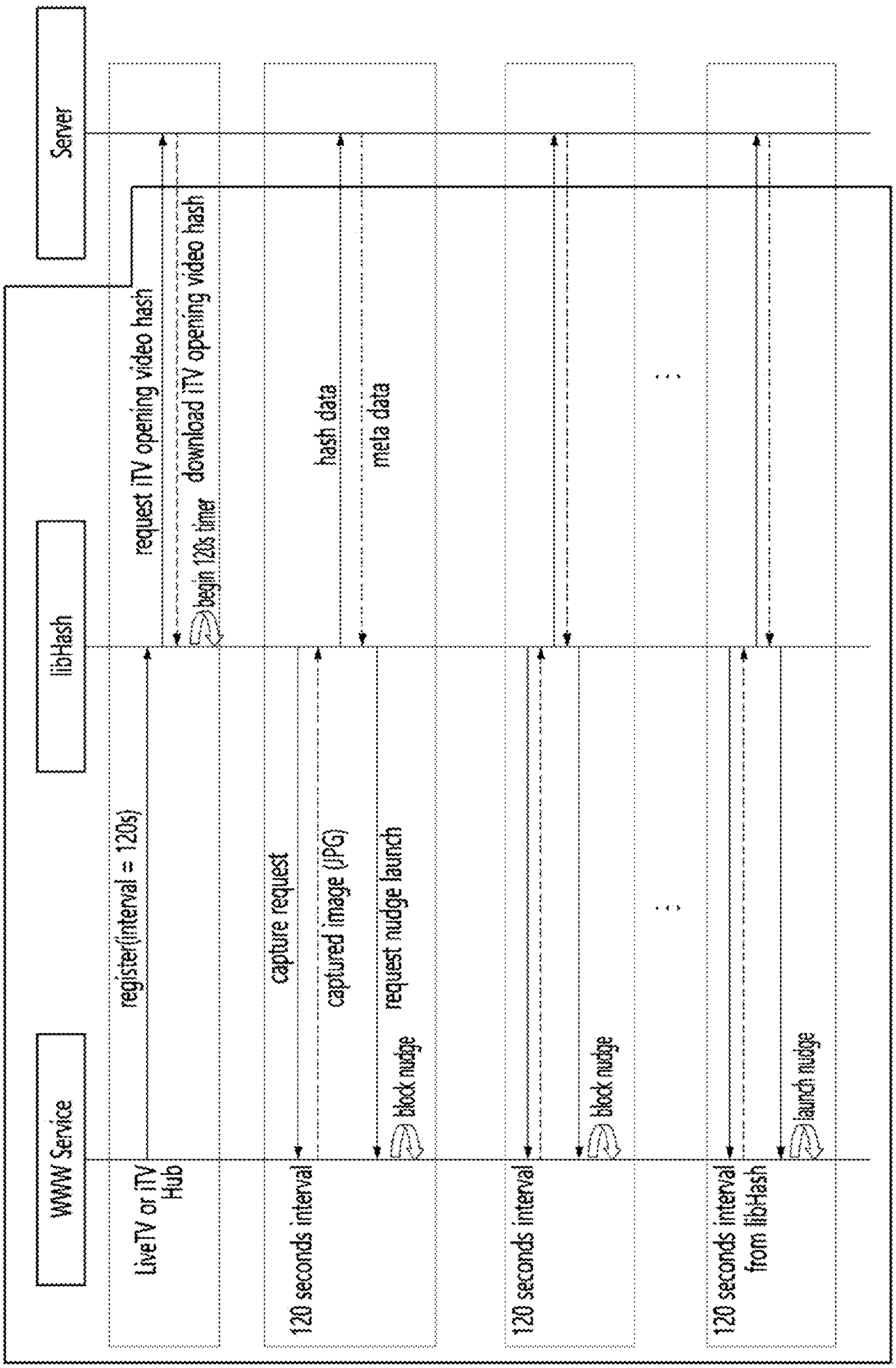

FIG. 5 illustrates a display device 100 that provides a nudge service according to an embodiment of the present disclosure. FIGS. 6 and 7 are flowcharts illustrating a process of processing a nudge service in the display device 100 of FIG. 5. FIG. 11 illustrates a screen in which general nudge service data 1110 is being provided according to an embodiment of the present disclosure.

Referring to FIG. 5, the processor 500 may include a www service 510, a capture service 520, a resource manager 530, etc. As described above, even if it is described as a service, a manager, etc. for convenience of explanation, it can be processed by a hardware configuration. Meanwhile, the remaining configuration, i.e., the processor 500 except for the memory 600 illustrated in FIG. 5, may be implemented in the form of a chip integrated into a single module.

The www service 510 is a configuration that performs processing such as screen capture in order to provide a nudge service on the display device 100. The www service may have its own library and may include a configuration that performs calculations and determinations related to the nudge provision. However, the www service 510 is only an example for the convenience of explanation, and the present disclosure is not limited thereto.

Meanwhile, in addition to the www service 510, FIG. 5 may further include various applications or services that can be operated. For example, the applications may include not only native applications but also applications downloaded and installed from the outside.

The capture service 520 may receive capture service requests from various applications or other services, including the www service 510.

The resource manager 530 is included in the capture library module (WebOS captureLib) 530 and can manage the allocation of capture resources, etc. based on priority checks (priority_check) for various capture requests that require capture resource allocation through the capture service 520.

The memory 600 can store various data required or processed by the processor 500 and can provide them upon request.

Referring to FIGS. 6 and 7, a specific process for providing a nudge service is described.

Referring to FIG. 6, when a content playback command is received (S101), the www service 510 can transmit a screen capture request to the capture service 520 (S103).

At this time, the www service 510 can request image data or files in JPG format through the screen capture request. However, the above JPG format is only an example and is not limited thereto.

In the above, the content playback command may indicate a command related to the content. Such content playback commands may include, for example, a power-on request, an input change request, and a channel change request. Accordingly, a control command for the display device 100 itself that is unrelated to the content, such as a volume control input, may be excluded from the content playback command.

The resource manager 530 may determine priorities for various applications or services (S105).

The capture service 520 can check whether to allocate resources according to priority through the resource manager 530 in order to determine whether to perform an operation according to the screen capture request of the www service 510. The resource manager 530 can return whether to allocate resources (or priorities) for the screen capture request through the capture service 520.

The capture service 520 or the resource manager 530 can determine whether another capture request is received (S107).

If there are multiple capture resource allocation requests, the resource manager 530 can determine the capture resource allocation priority for each request and determine whether to allocate the corresponding capture resource and return it. The determination of the priority is ultimately to determine whether to perform the capture of the screen being played according to the request of the www service 510 in S103.

As described above, the resource manager 530 can receive capture resource allocation requests according to screen capture requests from various applications and services as well as Automatic Content Recognition (ACR) services, as described below.

When a screen capture request is received from the www service 510, the capture service 520 can allocate capture resources and perform screen capture operations during playback according to the request if no other capture requests are received as a result of priority determination through the resource manager 530.

If no other capture request signal is received from the capture service 520 or library module, the capture operation according to the request can be performed to acquire image data and create an image file (S109).

The image file thus created can be transmitted to the www service 510 via the capture service 520 (S111).

www service 510 can obtain content information by performing an operation on the received capture image file and analyzing scene information on the content being played based on the operation result value (S113). The analysis can be performed by a separate server as illustrated in FIG. 7.

When content information is obtained through the above S113 process, the processor 500 can output pre-determined nudge service data for the corresponding content (S115).

At this time, the output (exposure) time of the nudge service can be determined based on, for example, the time information set in advance for the corresponding content or the detection of a pre-defined event or information. However, the processor 500 can periodically obtain a capture image file for the corresponding content and determine it through analysis through the operation between the www service 510, capture service 520, and resource manager 530 described above in order to identify the output time of the nudge service.

Meanwhile, as a result of the determination in the step S107, if the capture service 520 confirms through the resource manager 530 that there are multiple capture requests for limited capture resources or that capture requests are duplicated and the priority of other capture requests is relatively high, making it difficult to allocate capture resources, the capture service 520 may return the fact that the requested screen capture is impossible, such as the failure of the screen capture requested to the www service 510, and may return that the request for screen capture be re-executed.

Referring to FIG. 7, when Live TV, etc. is executed, the www service 510 may register a timer after initializing the library (libHash). At this time, a thread may be created according to the registered timer. Meanwhile, the timer may have an interval of 120 seconds, for example, but is not limited thereto.

When a timer is registered by the www service 510, the library can request opening video hash data for the corresponding content from the server and download the requested opening video hash data from the server. At this time, the server may include a service provider server that provides the content to an external server. In the above, the opening may include information about a content provider (CP: Contents Provider) or a service provider (SP: Service Provider), such as a logo that is pre-printed before the actual scene for the corresponding content is provided. Such opening data may be used to determine when the corresponding content is played through a different path, such as VOD, rather than a live broadcast content such as a broadcast program provided by a broadcaster. In other words, when playing the same content as VOD in a live broadcast and various content provider (CP) apps such as Netflix, Disney Plus, and iTV, an opening video can be selected as a feature that can determine whether the corresponding scene exists or not.

When the opening video hash data requested from the server is downloaded from the library, the timer pre-registered in the library in the www service 510 can be started.

Afterwards, as shown in FIG. 7, the processes can be performed sequentially or one of them at the interval, that is, at 120-second intervals.

First, the library makes a screen capture request to the www service 510, and the www service 510 can receive a screen capture image file in JPG format through the capture service 520 and the resource manager 530, as shown in FIGS. 5 and 6 described above, and return it to the library.

The library can perform a dhash operation on the screen capture image file in JPG format returned from the www service 510 to obtain hash data, and transmit the obtained hash data to the server. The server may return metadata corresponding to the hash data received from the library to the library.

The server may receive the dhash data calculated by the library, compare it with the data of the server DB, recognize scene information and content information, and return the corresponding metadata to the library.

The library may request the nudge launch of nudge service data to the www service 510 based on the metadata returned from the server.

The www service 510 may determine whether to output nudge service data, that is, nudge block (block nudge) or nudge output (output nudge), by determining the nudge service data launch request of the library.

As illustrated in FIG. 7, the www service 510 may continuously determine whether to output nudge in units of time (e.g., 120 seconds) set in the registered timer. However, this can be performed only when the nudge is not output, for example, according to the global nudge policy. According to the global nudge policy, for example, the nudge cannot be output again within 10 minutes, and if the nudge is output within 10 minutes, the process for outputting the nudge, etc. can be omitted.

As shown in the bottom of FIG. 7, the www service 510 can output the nudge as a result of determining whether the nudge is output every 120 seconds.

Meanwhile, although not shown in FIG. 7, the www service 510, the library, and the server can continue to perform the above-described operation repeatedly until the end point of the corresponding content according to the timer set in the library even after the nudge is output. This also applies when there are multiple nudge service data assigned to the corresponding content.

If the contents of the above-described FIGS. 5 to 7 are considered as examples of outputting a general nudge, FIGS. 8 to 10 below can be considered as examples of outputting a sponsor nudge.

FIG. 8 illustrates a display device 100 that provides a nudge service according to another embodiment of the present disclosure. FIGS. 9 and 10 are flowcharts illustrating a process of processing a nudge service in the display device 100 of FIG. 7. FIG. 12 illustrates a screen in which a nudge service is being provided according to another embodiment of the present disclosure.

In describing FIGS. 8 to 10 below, any description overlapping with FIGS. 5 to 7 will refer to the above-described contents, except where specifically necessary, and the following description will focus on differences.

In providing general nudge service data of FIGS. 5 to 7, the www service 510 requests screen capture of content being played back to the capture service 520, for example, and uses capture resources determined according to the capture resource allocation priority of the resource manager. However, in this case, if a screen capture request is sent to the capture service 520 from an application or service other than the www service 510, the priority of the screen capture request requested by the www service 510 for providing the nudge service may be late, and thus the capture resource allocation may not be received. In this case, referring to FIG. 7, the www service 510 may skip the capture of the corresponding timing according to the timer registered in the library and utilize the capture information of the next timing. However, there is no guarantee that the capture request of the next timing will also be allocated the capture resource and receive the capture information. This instability may cause a problem in that the nudge service cannot be provided properly because the scene information and content information of the content being played cannot be obtained at an appropriate timing. In addition, in the case where the content through the HDMI input described below is VOD, a sponsor nudge should be output instead of a general nudge, but according to the method of FIGS. 5 to 7, it may be problematic to properly determine which nudge to provide between the general nudge and the sponsor nudge.

Figure 9:
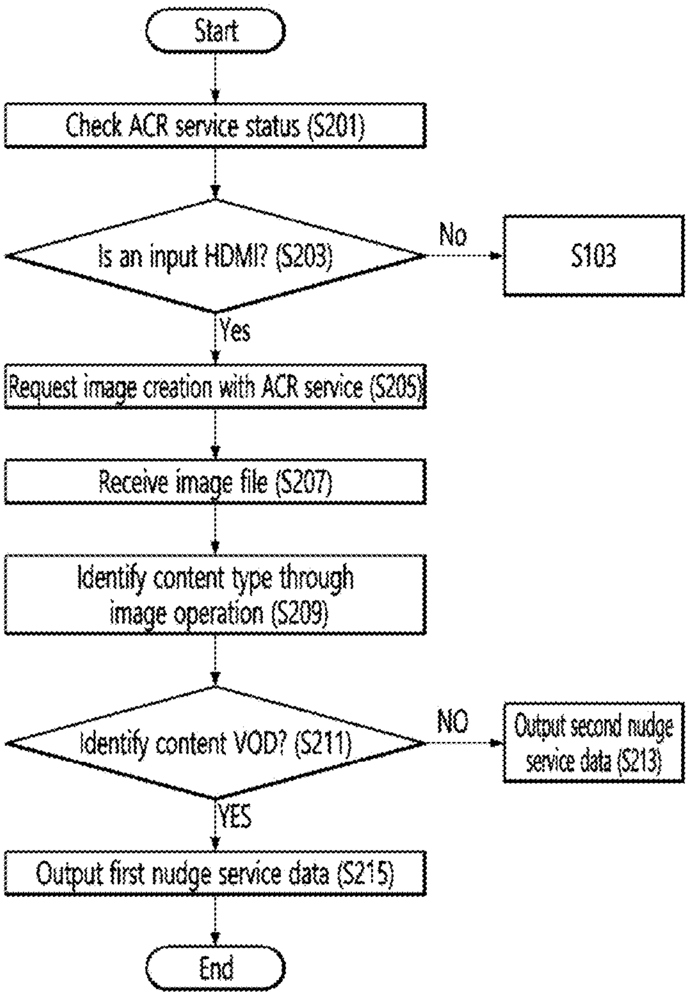
FIGS. 9 and 10 are flowcharts illustrating a process of processing a nudge service in the display device of FIG. 7.
Figure 10:
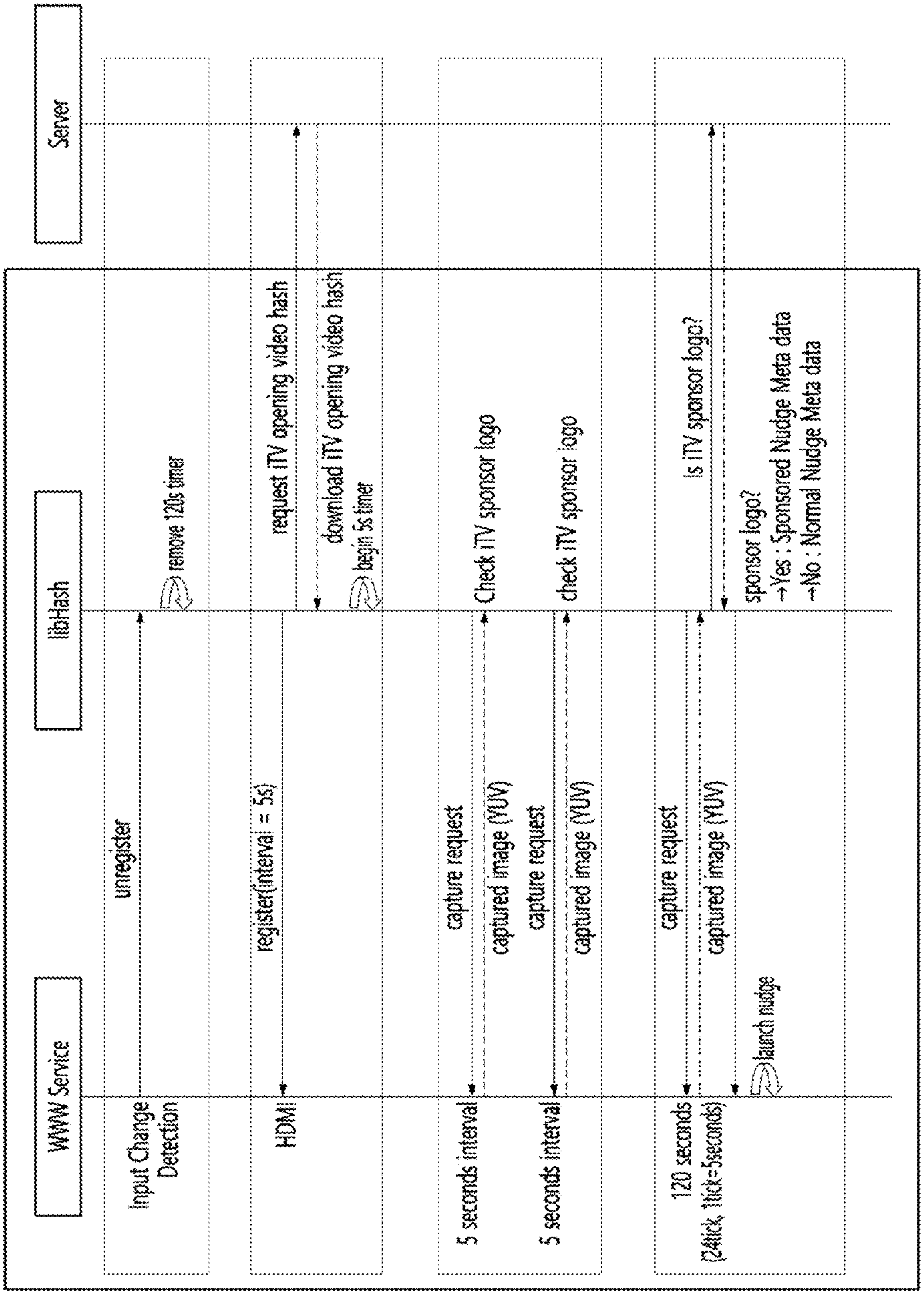

In addition, for example, in the case of content according to the HDMI input mentioned in FIGS. 8 to 10, the characteristics (e.g., type or attribute, etc.) of the corresponding content can be easily identified through the opening data, but it may be difficult to obtain screen capture data for the opening data with the timer registered in the library in FIGS. 5 to 7 and output sponsor nudge service data since the type of the corresponding content is VOD content.

Accordingly, in FIGS. 8 to 10, the ACR service is used as an example of one embodiment, but the present disclosure is not limited thereto. At this time, the ACR service can capture, for example, 1 to 10 frames per second. Preferably, the ACR service can capture 5 to 8 frames per second. However, such a number may be arbitrarily changed, and the present disclosure is not limited thereto.

However, if, for example, in the ACR service, capture is performed for frames more than 1 frame per second, and when registering a timer after initializing the library in the www service 510 according to the present disclosure, the registered timer may not be a problem if it is set to 1 second or more. However, in the present disclosure, the timer registered in the library may be set to approximately 1 to 10 seconds, preferably 3 to 7 seconds, which can be regarded as the opening section of the content, and may be set accordingly. In the present disclosure, for convenience, the opening section is explained as 5 seconds from the start of content playback as an example.

First, referring to FIG. 8, the display device 100 according to the present disclosure is configured to include a processor 500 and a memory 600, but unlike FIG. 5, the processor 500 may further include an ACR processing module 540.

As described above, the ACR service 540 continuously captures the screen in units of, for example, 5 to 8 frames per second for advertising content recognition.

Therefore, unlike the above-described embodiment, the present disclosure intends to use the ACR service as described above. However, the ACR service 540 may be used depending on the type of content described below, or may be used regardless of the type of content.

The processor 500 may check the status of the ACR service 540 to determine whether image data for the captured screen regarding the content currently being played can be obtained using the service.

The processor 500 can check the input currently being viewed.

The processor 500 can also process data in a different manner depending on the currently viewed input confirmed above.

For example, if the currently viewed input confirmed above is live TV (the same applies to VOD playback, such as iTV Hub App), it can be processed as described in FIGS. 5 to 7 above, for example. That is, the www service 510 obtains screen capture image data in JPG format through the capture service 520 and the resource manager 530, determines whether to provide a nudge service, and at the determined time, outputs general nudge service data, not sponsor nudge, to a screen area of the currently played content, as in FIG. 11.

On the other hand, if the currently viewed input confirmed above is not live TV but an HDMI input, the ACR service 540 can be used, unlike FIGS. 5 to 7.

That is, the www service 510 can request the ACR service 540 to capture the screen currently being viewed or to create a captured image file. At this time, the image file created may be image data in YUV format.

At this time, the ACR service 540 can use the image frame at the time of receiving the image file creation (or capture) request from the www service 510 to create an image file in YUV format and return it to the www service 510.

Therefore, according to the present embodiment, if the input currently being viewed is HDMI, when a screen capture request is made to the capture service 520 as in the past, the request may not be ignored or fail despite the screen capture request as a result of the resource manager 530 determining the priority. This is because the ACR service 540 receives capture resources in advance through the resource manager 530 and continues to capture the screen as described above. However, in the present disclosure, the www service 510 can obtain a screen capture image file in JPG format when using the capture service 520 path, but can obtain a screen capture image file in YUV format when using the ACR service 540 path. Therefore, the operation process in the www service 510 may be different in the two cases.

www service 510 can determine whether the content currently being viewed is live TV or VOD video by performing a dhash operation on the image data in YUV format returned from ACR service 540.

If the determination result is live TV, www service 510 can output general nudge service data (e.g., "Would you like to check Jang Man-wol's (character name) outfit?", "Click to see Geoff's outfit!", etc.) as in FIG. 10, and if it is VOD video, can output sponsor nudge service data (e.g., "Would you like to check the Nike basketball shoes worn by James Harden at JD Sports?", "Lace up like Steph with Under Armour!", etc.) as in FIG. 11.

Referring to FIGS. 9 and 10, the use of ACR service 540 in www service 510 will be described in more detail.

Referring to FIG. 9, the www service 510 can check the status of the ACR service 540 (S201).

The www service 510 determines whether the input is an HDMI (S203), and if not, can perform steps S103 and below of the aforementioned FIG. 7, for example.

On the other hand, if the www service 510 determines that the input is HDMI, it can request the ACR service 540 whose status was checked in step S201 to create an image file (S205).

Meanwhile, the www service 510 can perform at least one of steps S201 and S203 only when a content playback command is received.

The ACR service 540 can create an image file according to the request of the www service 510 (S207). The image file thus created can be transmitted to the www service 510.

When the www service 510 receives an image file generated from the ACR service 540 according to a request, it performs an operation based on the image data and can identify the type of content currently being played based on the result of the operation (S209).

If the type of the identified content is not a VOD video, the www service 510 can control to output general nudge service data (second nudge service data) as in FIG. 11 (S213).

However, if the type of the identified content is a VOD video, the www service 510 can control to output sponsor nudge service data (first nudge service data) as in FIG. 12 (S215).

Referring to FIG. 10, the www service 510, a library, and a server are illustrated for processing nudge service data. Each may be identical to the configuration of FIG. 7 described above. For convenience, FIG. 10 illustrates a flow that outputs sponsor nudge service data instead of general nudge service data as an example.

When an input change command (e.g., to an HDMI input) is executed, the www service 510 can initialize the library (libHash) to remove the current timer (e.g., interval of 120 seconds) and release the parasitic thread.

The www service 510 can register a new timer in the library. At this time, the interval of the new timer to be registered can be, for example, 5 seconds, but is not limited thereto.

When a new timer is registered by the www service 510, the library can create a thread accordingly. The library can request opening video hash data from the server and download the requested opening video hash data from the server. Meanwhile, the library can operate the timer when a new timer is registered by the www service 510.

Therefore, as shown in FIG. 10, the www service 510 can continue to communicate with the library at intervals of, for example, 5 seconds thereafter.

The library can make a capture request to the www service 510 at intervals of 5 seconds according to the set timer, and the www service 510 can return the image data in YUV format acquired through the ACR service 540 as described above in FIGS. 8 and 9 to the library in response to the request of the library.

When the captured screen image data is returned from the www service 510 according to the request, the library can check whether the sponsor logo generated based on the downloaded opening video hash data is included in the returned captured screen image data.

Determining whether the sponsor logo is included from the captured screen image data above is ultimately to determine whether to output sponsor nudge service data for the content being captured, that is, whether the content is a VOD video.

In the end, if the library determines that the content type is a VOD video, it may be decided to output sponsor nudge service data instead of a general nudge.

However, in this case, with respect to the timing of outputting the sponsor nudge service data, as illustrated in FIG. 10, the www service 510 performs a capture request and a screen capture image data return obtained through the library and the ACR service 540 for 24 ticks, and determines when the sponsor logo is output, that is, when to output the sponsor nudge service. At this time, in order to output the sponsor nudge service data, it may be determined whether the sponsor logo is included in the corresponding captured screen image data or whether the identified sponsor logo is the corresponding sponsor logo, for example, based on a determination request to the server and a return value. That is, if the server determines that the sponsor logo is included in the captured image data or returns a value indicating that the logo in the captured image data is a sponsor logo, the sponsor nudge service data can be controlled to be output, and if not, the general nudge service data can be output.

If the value is received from the server through the library to the www service 510, the www service 510 can launch the nudge service.

In the above, with regard to the determination of the output time of the nudge service data, 24 ticks are only an example, and the present disclosure is not limited thereto. Meanwhile, in the above, 1 tick can be defined as 5 seconds, but is not limited thereto.

The above description is merely an exemplary description of the technical idea of the present disclosure, and those with common knowledge in the technical field to which the present disclosure belongs can make various modifications and variations without departing from the essential characteristics of the present disclosure.

Therefore, the embodiments disclosed in this disclosure are not intended to limit the technical idea of this disclosure but to explain it, and the scope of the technical idea of this disclosure is not limited by these embodiments.

The protection scope of this disclosure should be interpreted by the claims below, and all technical ideas within the equivalent scope should be interpreted as being included in the scope of the rights of this disclosure.

Industrial Applicability

According to the display device according to the present disclosure, since it is possible to provide an appropriate nudge service in a timely manner according to the characteristics of the content, it has industrial applicability.

What is claimed is:

1. A display device comprising:
 a memory;
 a controller configured to:
  control a first service to generate an image file of a first format for a screen of content being played according to a content playback command, and
  output first nudge service data when a type of the content being played is a first content type based on the image file of the first format,
  initialize a library of the first service,
  set a first timer for the first service,
  create a thread executed according to a predetermined cycle,
  control to remove a first timer preset for the first service to release a first thread,
  control to set a second timer to generate a second thread,
  request hash data of an opening video from a server,
  download the hash data,
  when capture data in a second format different from the first format is acquired, transmit the hash data to the server to receive metadata corresponding to the content, and
  control second nudge service data to be output on an area of the content; and
 a display configured to output the first nudge service data on a portion of the screen of the content.

2. The display device according to claim 1, wherein the controller is configured to control to request data for an opening video from the first service to a server and to download data for the requested opening video from the server.

3. The display device according to claim 2, wherein the controller is configured to control to transmit a request for generating an image file in the first format to a second service based on the second timer set in the first service.

4. The display device according to claim 3, wherein the controller is configured to control to perform a dhash operation on an image file in the first format transmitted from the second service in the first service.

5. The display device according to claim 4, wherein the controller is configured to control to identify the type of the content being played by comparing a result of the dhash operation on the image file in the first format in the first service with hash data pre-stored in a database.

6. The display device according to claim 5, wherein the controller is configured to control to output second nudge service data when the type of the content being played as a second content type as a result of the identification in the first service.

7. The display device according to claim 6, wherein the controller is configured to control to identify the type of the content by identifying logo data in the image file of the first format transmitted from the second service in the first service.

8. The display device according to claim 6, wherein the first nudge service data is sponsor nudge service data, and the second nudge service data is a general nudge service data set regardless of the content being played.

9. The display device according to claim 6, wherein the type of the content is that the first content type is a video on demand (VOD) video, and the second content is a live TV video.

10. The display device according to claim 1, wherein the controller is configured to control to output the first or second nudge service data by obtaining a capture image of the content being played in the first format or the second format at a predetermined interval when the content being played is identified in the first service.

11. The display device according to claim 1, wherein the content playing command is a command for one of a power-on request, an input switching request, and a channel change request.

12. The display device according to claim 11, wherein the image file of the first format is YUV image data, and the image file of the second format is JPG image data.

13. A method for providing a nudge service in a display device, comprising:
 receiving a content playback command;
 generating an image file of a first format for a screen of content being played;
 identifying a type of the content being played based on the image file of the first format and outputting first nudge service data when the identified type of the content is a first content type;
 initializing a library of a first service, setting a first timer for the first service, and creating a thread executed according to a predetermined cycle;
 removing the first timer preset for the first service to release a first thread, and setting a second timer to generate a second thread;
 requesting hash data of an opening video from a server and downloading the hash data;
 when capture data in a second format different from the first format is acquired, transmitting the hash data to the server to receive metadata corresponding to the content and outputting second nudge service data on an area of the content;
 outputting the first and second specific nudge service data on an area of a screen of the content.

* * * * *